No. 669,595. Patented Mar. 12, 1901.
C. R. REYNOLDS.
ELECTRICAL CONTROLLER.
(Application filed Mar. 2, 1900.)

(No Model.) 2 Sheets—Sheet 1.

Witnesses:
F. G. Holcomb.
C. E. Buckland.

Inventor
Charles R. Reynolds.
by
Harry R. Williams
atty.

No. 669,595. Patented Mar. 12, 1901.
C. R. REYNOLDS.
ELECTRICAL CONTROLLER.
(Application filed Mar. 2, 1900.)
(No Model.) 2 Sheets—Sheet 2.
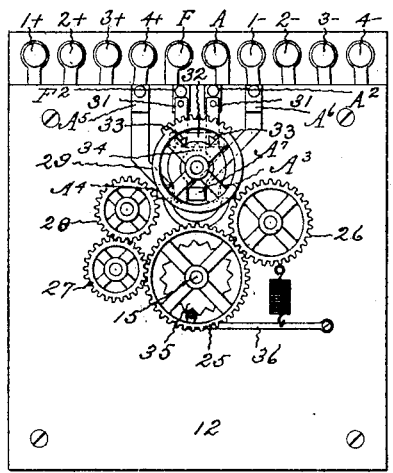
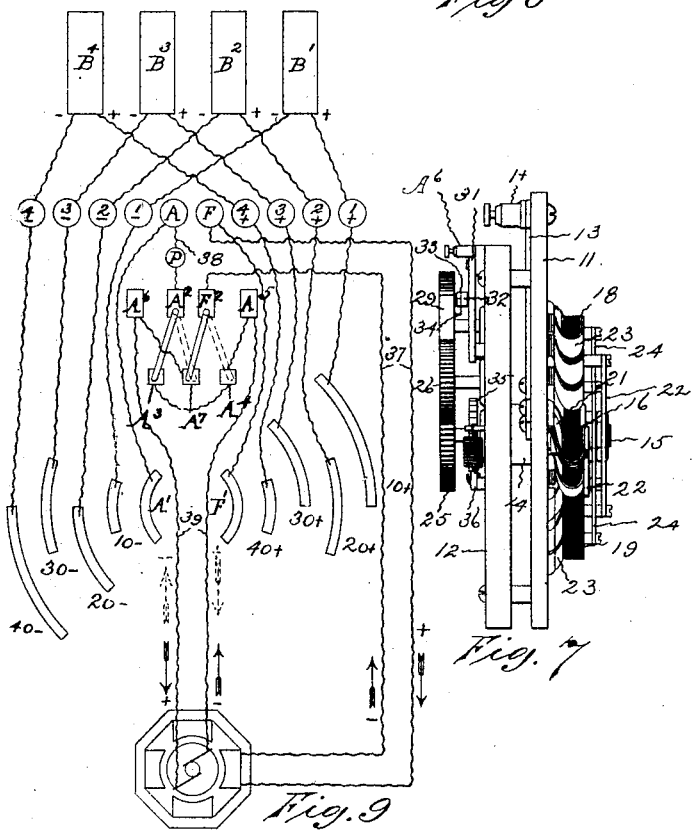
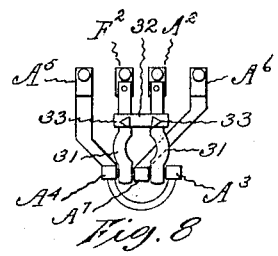
Witnesses:
F. G. Holcombe
C. E. Buckland
Inventor.
Charles R. Reynolds
by Harry R. Williams
atty

UNITED STATES PATENT OFFICE.

CHARLES R. REYNOLDS, OF HARTFORD, CONNECTICUT, ASSIGNOR TO HENRY J. COGGSWELL AND HALSEY B. PHILBRICK, OF SAME PLACE.

ELECTRICAL CONTROLLER.

SPECIFICATION forming part of Letters Patent No. 669,595, dated March 12, 1901.

Application filed March 2, 1900. Serial No. 7,085. (No model.)

*To all whom it may concern:*

Be it known that I, CHARLES R. REYNOLDS, a citizen of the United States, residing at Hartford, in the county of Hartford and State of Connecticut, have invented certain new and useful Improvements in Electrical Controllers, of which the following is a specification.

This invention relates to those controllers which are designed for opening and closing and changing the connections of electrical circuits between storage batteries or other sources of electrical power and the motors of automobiles, tram-cars, or other electrically-propelled vehicles.

The object of the invention is to provide a very simple, efficient, and compact controller that can be conveniently operated by simple movements to direct to the motor field and armature current of the desired strength and quantity for accomplishing the work required and to so construct such a controller that it may be quickly disassembled for cleaning or repairing.

The insulating-base of the embodiment of the invention illustrated has a number of binding-posts for the connection of the circuit-wires, and each post is electrically connected with a fixed contact-plate. A rotatable arbor which is supported by the base concentrically of the contact-plates has removably fixed to one end projecting arms holding spring contact-fingers that in the different positions to which the arms are moved engage various combinations of the contact-plates. The arbor on the other end has a gear that is arranged to be engaged by gearing that is adapted to be turned by the operating-handle, the movement of which causes the gears to move the arms with the contact-fingers and at the same time to operate a switch that controls the direction of the flow of the current.

Figure 1:
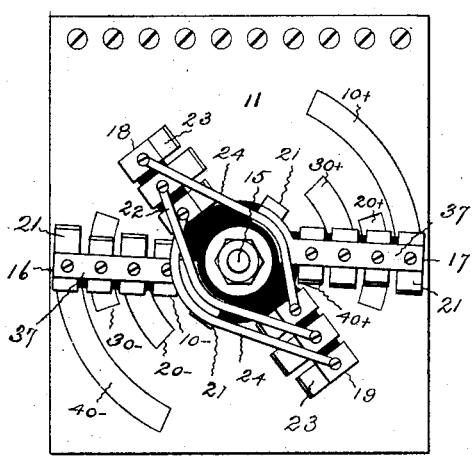
Figure 2:
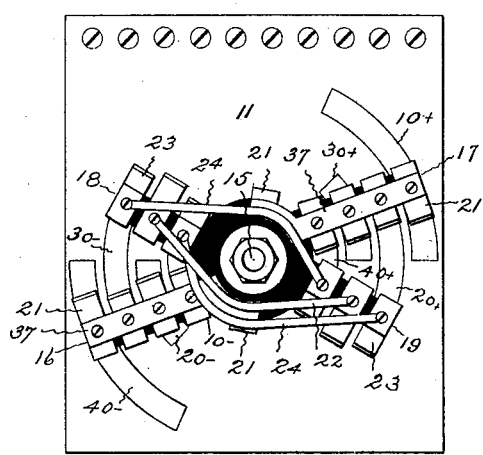
Figure 3:
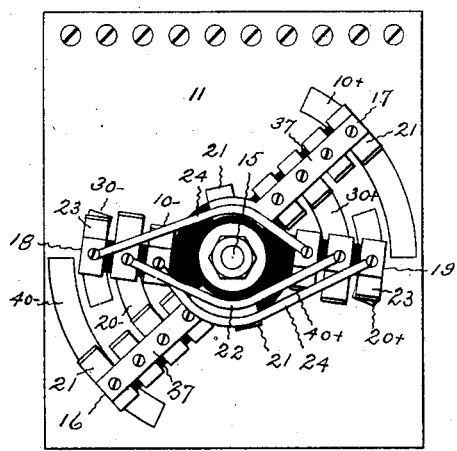
Figure 4:
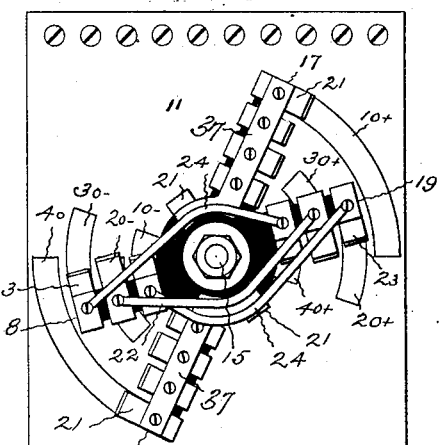
Figure 5:
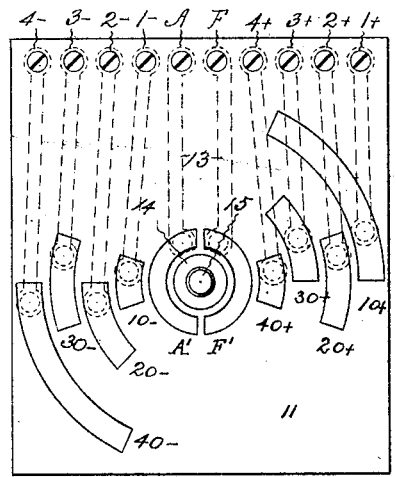

Figure 1 of the accompanying drawings shows a view of one side of the controller with the arms in the positions occupied when all of the circuits are open. Fig. 2 is a similar view with the arms in such positions that the circuits are connected in parallel. Fig. 3 is a like view with the arms in such positions that some of the circuits are joined in series and the several series are connected in parallel. Fig. 4 is a view showing the positions of the arms when all the circuits are joined in series. Fig. 5 is a plan of one side of the base with the arms and spring contact-fingers removed in order to show the fixed contact-plates and their connections. Fig. 6 is a plan of the other side of the base, showing the means for moving the arms and for reversing the current. Fig. 7 is a view looking at one edge of the controller. Fig. 8 is a detail view of the reversing-switch, and Fig. 9 is a diagram illustrating the circuits.

The base of the controller shown is formed of two pieces of insulation 11 and 12, which may be slate, fiber, or any other approved material. These pieces are fastened together with a small space between. Curved contact-plates $10^+$, $20^+$, $30^+$, $40^+$, $10^-$, $20^-$, $30^-$, $40^-$, A', and F', of various lengths, are fastened to the outer face of the piece 11 on the arcs of concentric circles. These plates are shown as flush with the outer surface of the base-piece. The plates could, if desired, be fixed edgewise instead of flatwise. A number of binding-posts $1^+$, $2^+$, $3^+$, $4^+$, $1^-$, $2^-$, $3^-$, $4^-$, A, and F are fastened to the inner face of the base-piece 11, and each is connected with a curved fixed contact-plate by a strip 13. A bushing 14 at the center of the base loosely supports an arbor 15. On one end of the arbor are the outwardly-extending arms 16, 17, 18, and 19, made of insulating material. These arms are keyed, so as to rotate with the arbor, and are secured by set and clamp nuts. Each of the arms 16 and 17 has five spring-fingers 21, electrically connected by a strip 37 and arranged to make contact with five fixed plates. The inmost spring-finger on the arm 16 always remains in contact with the fixed plate A', and the inmost spring-finger on the arm 17 always remains in contact with the fixed plate F'; but the four outer fingers on each of these arms are or are not in contact with fixed plates, according to the position of the arms. Each arm 18 and 19 has three spring-fingers 23, arranged to make contact with three of the fixed plates when the arms are moved to the correct positions. The outer finger on each of the arms 18 and 19 is connected with the inner finger on the opposite arm by strip 24, and the middle fingers of these arms are connected by strip 22. More or less contact-plates may be employed, and the number of spring-fingers may be varied. If the fixed plates were turned edgewise, these fingers could be made in the form of blades. By removing the nuts on the main arbor the arms bearing the spring-fingers can be instantly removed and all of the contact parts can be reached for cleaning, adjusting, or repairing. On the other side of the base a gear-wheel 25 is fastened to the central arbor 15, and meshing with this is a gear-wheel 26 and a gear-wheel 27, the latter being in mesh with a gear-wheel 28. A mutilated gear 29 is mounted upon this face of the base in such position that when turned in one direction its teeth engage the gear 26 and when turned in the other direction its teeth engage the gear 28. The arbor bearing the contact-finger arms is rotated in the same direction whether the mutilated gear 29 engages the gear 26 or the gear 28. The mutilated gear 29 is designed to be connected with and rotated by a controller-handle in any common manner.

Beneath the mutilated gear are the swinging blades 31 of a reversing-switch. The hinged ends of these blades are connected with binding-posts $A^2 F^2$, secured to the outer face of the base-piece 12, while the movable ends of these arms are adapted to be swung into engagement with contacts $A^3 A^7$ or $A^7$ and $A^4$, also secured to the outer face of this piece of the base. The contacts $A^3$ and $A^4$ are connected together. The contact $A^4$ is connected with a binding-post $A^5$, and the contact $A^7$ is connected with a binding-post $A^6$. The hinged switch-arms are joined by an insulating-bar 32, so that they will move together, and this bar is provided with outwardly-projecting lugs 33. Projecting from the inner face of the mutilated gear 29 is a lug 34. When the mutilated gear is rotated in one direction, the lug it carries engages one of the switch-lugs, so as to throw the switch-blades into engagement with one set of contacts, and when the mutilated gear is rotated in the other direction its lug engages the other switch-lug and moves the switch-blades into engagement with the other set of contacts. The lugs are so located and shaped that after the switch-blades have been moved into engagement with the desired contacts the lugs disengage and the mutilated gear continues moving without moving the switch-blades.

When the handle of a controller of this construction is turned in one direction from the off position, the mutilated-gear lug engages a switch-lug and throws the switch-blades so that the current will flow to the motor in the desired direction, and then the continued movement of the mutilated gear causes the other gears to transmit movement to the contact-finger arms and make the connections necessary for the desired flow. If the handle is moved from the off position in the reverse direction, the mutilated-gear lug engages the other switch-lug and causes the switch to be so moved as to reverse the direction of the current, and then the continued movement of the mutilated gear transmits through the other gears the proper motion to make the necessary connections between the contact-fingers and the contact-plates. The movements of the contact-finger arms are in the same directions whether the handle is started one way or the other way, so that the switch is first set for causing the flow in the desired direction, and then whether the current is flowing one way or the other the succeeding movements of the handle cause the same combinations of circuits for power and speed to be made.

It is preferred to place a star-wheel 35 upon the main arbor and to engage the star-wheel with a spring-detent 36, so that the movements of the arms will be quickly effected the correct distances to make the proper contacts between the movable spring-fingers and the fixed plates.

The batteries $B' B^2 B^3 B^4$, having any desired number of cells, have their positive terminals respectively connected with the binding-posts $1^+$, $2^+$, $3^+$, and $4^+$ and have their negative terminals respectively connected with the binding-posts $1^-$, $2^-$, $3^-$, and $4^-$, each of which binding-posts, as before described, is connected with a fixed curved contact-plate. The binding-post F, which is connected with one of the curved fixed contact-plates, is connected with the binding-post $F^2$ of the reversing-switch by a conductor 37, that is connected with the field-magnet of the motor. The binding-post A, which is also connected with one of the curved fixed contact-plates, is connected with the binding-post $A^2$ of the reversing-switch by a conductor 38, connected with a safety-plug P. The binding-posts $A^5$ and $A^6$ of the reversing-switch are connected by conductors 39 with the motor-armature. The current always passes to the field in the same direction; but it passes to the armature in one direction when the switch-blades engage the contacts $A^3$ and $A^7$ and in the other direction when the switch-blades engage the contacts $A^7$ and $A^4$, as illustrated by Fig. 9.

When the controller-handle is moved from the off position one step in either direction after the reversing-switch is moved, the spring-fingers 21 on the arms 16 and 17 make contact with all of the curved fixed plates, and as the fingers on each of these arms are connected together and as the fingers on the arms 18 and 19 are not in contact with any of the plates this joins all of the battery-circuits in parallel, Fig. 2. The next forward movement of the handle causes the arms to so move that each of three of the spring-fingers on each of the arms 16 and 17 engages with a contact-plate, while each of two of the spring-fingers on each of the arms 18 and 19 engages with another of the contact-plates, and this so closes the circuits that battery B' and battery B² are joined in series and batteries B³ and B⁴ are joined in series, while the two series of two batteries each are connected in parallel, Fig. 3. The third forward movement of the handle moves the arms into such positions that the outer spring-fingers on the arms 16 and 17 engage the outer fixed contacts and the inner spring-fingers engage the inner fixed contacts, while the spring-fingers on the arms 18 and 19 engage the other fixed contacts. This connects the positive pole of each battery with the negative pole of the next battery and joins all in series, Fig. 4.

This controller is flat and occupies but little space. The direction of flow of current is decided by the direction of movement of the handle from the off position. The spring-fingers, which form the movable contact-brushes, are all removable for cleaning, repairing, or adjusting by simply unscrewing the nuts which hold the arms upon the arbor, and these mechanisms are cheap to manufacture and are so assembled that they are not liable to become disarranged or damaged.

I claim as my invention—

1. An electrical controller having an insulating-base, contact-plates fixed to the base, a rotatable arbor concentric with the fixed contacts, arms removably carried by the arbor, means for detachably fastening the arms to the arbor, contact-fingers borne by the arms, the contact-fingers on some of the arms being electrically connected while the contact-fingers on each of the other arms are insulated from each other, and mechanisms for rotating the arbor, substantially as specified.

2. An electrical controller having an insulating-base, contact-plates fixed to the base, a rotatable arbor concentric with the fixed contacts, arms carried by the arbor, contact-fingers borne by the arms, the contact-fingers on some of the arms being electrically connected while the contact-fingers on each of the other arms are insulated from each other, mechanisms for rotating the arbor, and a reversing-switch thrown by the movement of the arbor-rotating mechanisms, substantially as specified.

3. An electrical controller having an insulating-base, curved contact-plates of different lengths fixed flatwise to the base on the arcs of different concentric circles, a rotatable arbor concentric with the fixed contacts, arms carried by the arbor, contact-fingers borne by the arms, the contact-fingers on some of the arms being electrically connected while the contact-fingers on each of the other arms are insulated from each other, and means for rotating the arbor, substantially as specified.

4. An electrical controller having an insulating-base, contact-plates fixed to the base, a rotatable arbor concentric with the fixed contacts, four outwardly-extending arms supported by the arbor, two of said arms bearing a like number of contact-fingers, those on each arm being electrically connected, and two of said arms bearing a smaller number of contact-fingers, each finger on one of the latter arms being connected with a finger on the other of the latter arm, and means for rotating the arbor, substantially as specified.

5. An electrical controller having a flat insulating-base, contact-plates fixed to the base, a rotatable arbor concentric with the contact-plates, arms removably carried by the arbor and extending substantially parallel with the plane surface of the base, means for detachably fastening the arms to the arbor, contact-fingers borne by the arms, the contact-fingers on some of the arms being electrically connected while the contact-fingers on each of the other arms are insulated from each other, and mechanisms for rotating the arbor, substantially as specified.

6. An electrical controller having a flat insulating-base, contact-plates fixed to the base, a rotatable arbor extending through the base concentric with the fixed contacts, arms removably carried by the arbor on one side of the base, and extending substantially parallel with the plane surface of the base, means for detachably fastening the arms to the arbor, contact-fingers borne by the arms, the contact-fingers on some of the arms being electrically connected while the contact-fingers on each of the other arms are insulated from each other, and mechanisms for rotating the arbor attached to the other side of the base, substantially as specified.

7. An electrical controller having a flat insulating-base, contact-plates fixed to the base, a rotatable arbor concentric with the fixed contacts, arms carried by the arbor, contact-fingers borne by the arms, the contact-fingers on some of the arms being electrically connected while the contact-fingers on each of the other arms are insulated from each other, gears for rotating the arbor, and a reversing-switch thrown by the rotation of the gears, substantially as specified.

8. An electrical controller having a base, contact-plates fixed to the base, a rotatable arbor concentric with the fixed contacts, arms carried by the arbor, contact-fingers borne by the arms, a gear fastened to the arbor, gears meshing with the arbor-gear, a mutilated gear for rotating the latter gears, and a reversing-switch thrown by the movement of the reversing-gear, substantially as specified.

9. An electrical controller having a base formed of two flat pieces of insulating material, contact-plates fixed to the face of one piece of insulating material, a removable arbor extending through the insulating-pieces concentric with the fixed contacts, arms carried by the arbor on one side of the base, contact-fingers borne by the arms, the contact-fingers on some of the arms being electrically connected while the contact-fingers on each of the other arms are insulated from each other, a gear fixed to the arbor on the other side of the base, and gears for rotating the arbor-gear, substantially as specified.

10. An electrical controller having an insulating-base, contact-plates fixed to the base, binding-posts fastened to the base, conductors connecting the binding-posts with the fixed contacts, a rotatable arbor concentric with the fixed contacts, arms removably carried by the arbor, contact-fingers borne by the arms, the contact-fingers on some of the arms being electrically connected while the contact-fingers on each of the other arms are insulated from each other, mechanisms for rotating the arbor, a reversing-switch thrown by the movement of the arbor-rotating mechanisms, and connections between the reversing-switch and the binding-posts, substantially as specified.

11. An electrical controller having a base, contact-plates fixed to the base, a rotatable arbor concentric with the fixed contacts, arms carried by the arbor, contact-fingers borne by the arms, a gear fastened to the arbor, gears meshing with the arbor-gear, a mutilated gear for rotating the latter gears, a reversing-switch, lugs projecting from the reversing-switch, and a lug projecting from the mutilated gear and adapted to engage the reversing-switch lugs, substantially as specified.

12. An electrical controller having an insulating-base, contact-plates of different lengths fixed flatwise to the base on the arcs of different concentric circles, a rotatable arbor concentric with the fixed contacts, contact-fingers rotatable with the arbor, a number of the adjacent fingers being electrically connected and a number of the adjacent fingers being insulated from each other but electrically connected with fingers at a distance, and means for rotating the arbor, substantially as specified.

CHARLES R. REYNOLDS.

Witnesses:
  H. R. WILLIAMS,
  F. G. HOLCOMBE.